United States Patent [19]

Okada

[11] Patent Number: 4,986,073
[45] Date of Patent: Jan. 22, 1991

[54] AXLE DRIVING APPARATUS

[75] Inventor: Hideaki Okada, Takarazuka, Japan

[73] Assignee: Kanzaki Kokyukoki Mfg. Co., Ltd., Amagasaki, Japan

[21] Appl. No.: 304,644

[22] Filed: Feb. 1, 1989

[30] Foreign Application Priority Data

| Feb. 3, 1988 | [JP] | Japan | 63-24193 |
| Mar. 9, 1988 | [JP] | Japan | 63-55828 |
| Apr. 18, 1988 | [JP] | Japan | 63-51707[U] |

[51] Int. Cl.$^5$ ............................................. F16D 39/00
[52] U.S. Cl. ....................................... 60/454; 60/464; 60/487; 60/494
[58] Field of Search ............... 60/464, 494, 487, 453, 60/454, 484, 485; 91/505; 180/305, 307, 53.1, 53.4

[56] References Cited

U.S. PATENT DOCUMENTS

| 2,945,382 | 7/1960 | Ritter et al. |
| 3,360,933 | 1/1968 | Swanson et al. |
| 3,430,438 | 3/1969 | Weiss |
| 3,687,212 | 8/1972 | Forster |
| 3,751,924 | 8/1973 | Brown et al. |
| 3,903,698 | 9/1975 | Gellatly et al. ............ 60/464 X |
| 3,944,010 | 3/1976 | Winter et al. |
| 4,137,717 | 2/1979 | Forster |
| 4,145,883 | 3/1979 | Forster .................... 60/490 X |
| 4,324,275 | 4/1982 | Ward ........................ 60/494 X |
| 4,616,478 | 10/1986 | Jensen ...................... 91/505 X |
| 4,627,237 | 12/1986 | Hutson |

FOREIGN PATENT DOCUMENTS

| 3239223 | 10/1982 | Fed. Rep. of Germany. |
| 995691 | 7/1979 | France. |

Primary Examiner—Edward K. Look
Attorney, Agent, or Firm—Sterne, Kessler, Goldstein & Fox

[57] ABSTRACT

An axle driving apparatus which houses in a transmission casing thereof a hydraulic motor and a hydraulic pump at a hydro-static-transmission and disposes in the transmission casing a center section for connecting the hydraulic motor and hydraulic pump, thereby fixing the center section at the butt joint of the casing and which disposes an oil filter and check valves or the like in the center section so that lubricating oil in the transmission casing is made absorbable as operating oil for the hydro-static-transmission.

3 Claims, 15 Drawing Sheets

FIG·1

FIG·5
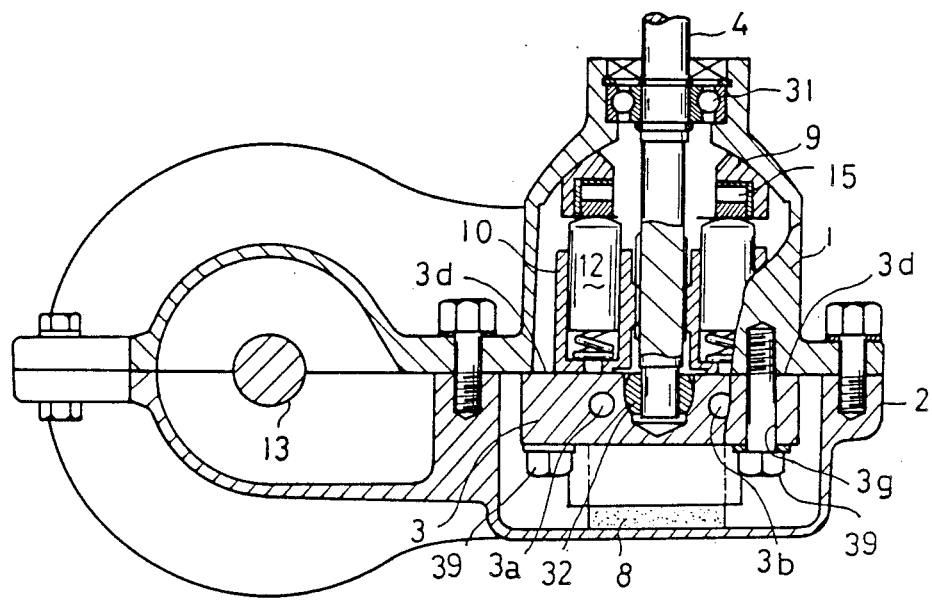
FIG·6
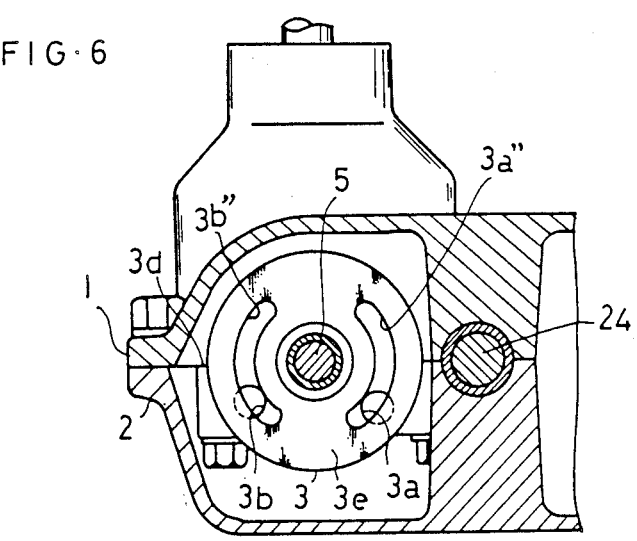

AXLE DRIVING APPARATUS

FIELD OF THE INVENTION

The present invention relates to an axle driving apparatus housing therein a hydro-static-transmission used as a driving unit for a light tractor.

DESCRIPTION OF THE PRIOR ART

Conventionally, an axle driving apparatus which vertically divides its casing, journals axles at the divided surfaces, and drives the axles by a hydro-static-transmission attached to the casing, is well known as disclosed in, for example, the Japanese Utility Model Publication Gazette No. Sho 62-44198 and the Japanese Patent Laid-Open Gazette No. Sho 62-101945.

In the prior art, however, the hydro-static-transmission is quite separate from the axle driving apparatus and exposed to the outside thereof, thereby being large-sized as a whole and larger in gross weight. Also, since a motor shaft of a hydraulic motor vertically disposed at the exterior drives the axles horizontally disposed, bevel gears must be interposed between the drive systems of both the units.

SUMMARY OF THE INVENTION

An object of the present invention is to provide an axle driving apparatus which tightly encloses a hydraulic motor and a hydraulic pump of a hydro-static-transmission in a transmission casing, a center section connecting the hydraulic motor and hydraulic pump is tightly enclosed in the same, thereby reducing the transmission casing in size. Hence, even when operating oil leaks from part of the hydro-static-transmission to the exterior, the leaked operating oil drops into the transmission casing, where the leaked oil be seen from the exterior.

Also, an operating oil suction port and an oil filter are provided at the center section so that lubricating oil in the transmission casing can be taken in as operating oil for the hydro-static-transmission.

Also, the center section is provided with at least one operating oil suction port through which the operating oil is supplied from the interior of transmission casing and check valves are provided at the suction ports to be used also as short-circuit valves, thereby making the hydraulic motor freely rotatable.

The above and further objects and novel features of the invention will more fully appear from the following detailed description when the same is read in connection with the accompanying drawings.

BRIEF DESCRIPTION OF THE DRAWINGS

FIG. 5 is a sectional view taken on the line VI—VI in FIG. 3, FIG. 6 is a sectional view taken on the line II—II in FIG. 3.

DESCRIPTION OF THE PREFERRED EMBODIMENTS

Figure 1:
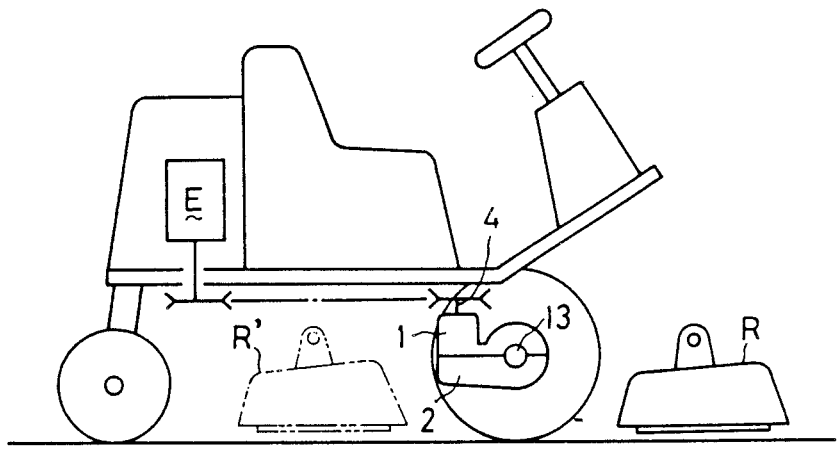
FIG. 1 is a side view of a light tractor attached with an axle driving apparatus of the invention.

Referring to FIG. 1, a light tractor loading thereon an engine E of a vertical crank shaft is shown.

A pulley is fixed to the vertical crank shaft of the engine so that a driving power is transmitted from the pulley through a belt to a pulley fixed to a pump shaft 4 of a hydraulic pump projecting upwardly from an axle driving apparatus of the invention.

The tractor is provided, at the front or under the body, with a mower R or R' to thereby mow a lawn.

The present invention relates to the axle driving apparatus for driving axles 13 of the tractor.

A transmission casing of the axle driving apparatus is formed in upper and lower half casings 1 and 2, both the casings being jointed to form one closed-type transmission casing.

Figure 3:
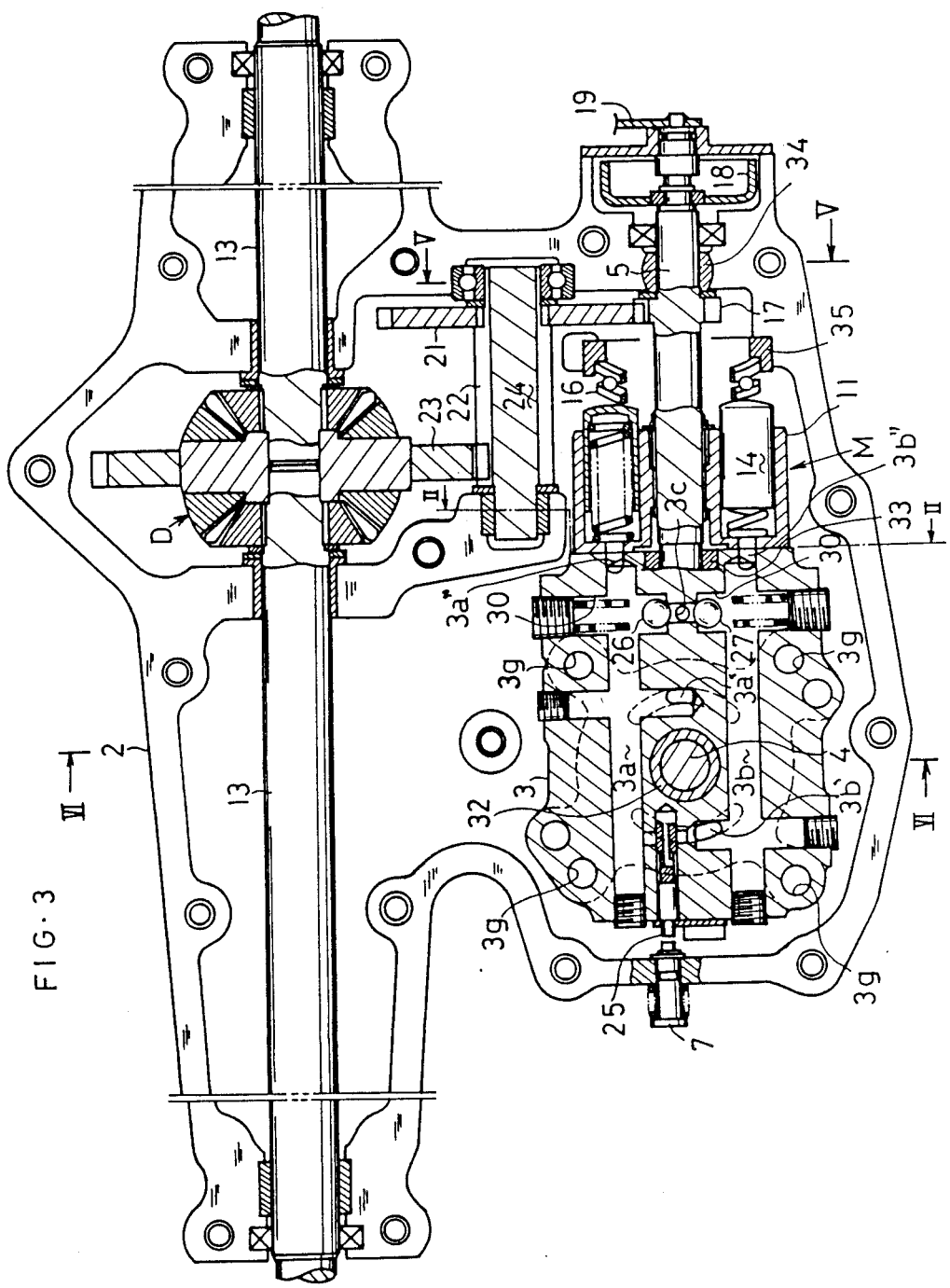
FIG. 3 is a sectional view taken on the line I—I in FIG. 2, in which an upper half casing is removed from the FIG. 2 embodiment.

Between the butt joint surfaces of the upper and lower half casings 1 and 2 are held bearings to the axles 13 and a counter shaft 24 and a bearing 34 for one end of a motor shaft 5 (FIG. 3).

At the lower surface of the upper half casing 1 is formed a mounting surface so that a center section 3 fixedly supporting the hydraulic pump P and a hydraulic motor M is mountable to the mounting surface through bolts 39 inserted into bolt holes 3g from below.

Where the center section 3, fixing thereto the hydraulic motor M and hydraulic pump P, is mounted to the lower surface of the upper half casing 1, the lower half casing 2 is jointed from below with the lower surface of the upper half casing 1 in a manner which closes the lower half casing 2. Bolts are used to connect both the upper and lower half casings 1 and 2.

The upper and lower half casings 1 and 2 are formed by aluminum die casting, whereby parts subjected to mechanical processing are reduced to lower the manufacturing cost.

The HST type transmission stored within the axle driving apparatus comprises the hydraulic pump P, center section 3 and hydraulic motor M, so that a pump mounting surface 3d and a motor mounting surface 3e are formed in the plane perpendicular to the center section 3.

Pairs of crescent-shaped oil passages 3a' and 3b' and 3a" and 3b" are formed at the pump mounting surface 3d and motor mounting surface 3e, the pair of crescent-shaped oil passages 3a" and 3b" at the motor mounting surface 3e and pair of crescent-shaped oil passages 3a" and 3b' at the pump mounting surface 3d being connected to two oil passages 3a and 3b to constitute a closed circuit.

A cylinder block 10 for the hydraulic pump P is rotatably mounted on the pump mounting surface 3d and pistons 12 are inserted vertically slidably into a plurality of piston holes at the cylinder block 10 respectively.

When the pump shaft 4 supported by a bearing 31 at the upper half casing 1 and a spherical bush 32 at the pump mounting surface 3d is rotated, the cylinder block 10 and pistons 12 rotate.

A thrust bearing 15 abutting against the upper end of each piston is changed at an angle by a swash plate 9, so that the discharge rate and discharge direction of the hydraulic pump P are changed to supply the discharged pressure oil from the oil passages 3a' and 3b' at the center section 3 to the hydraulic motor M through the oil passages 3a and 3b.

Figure 4:
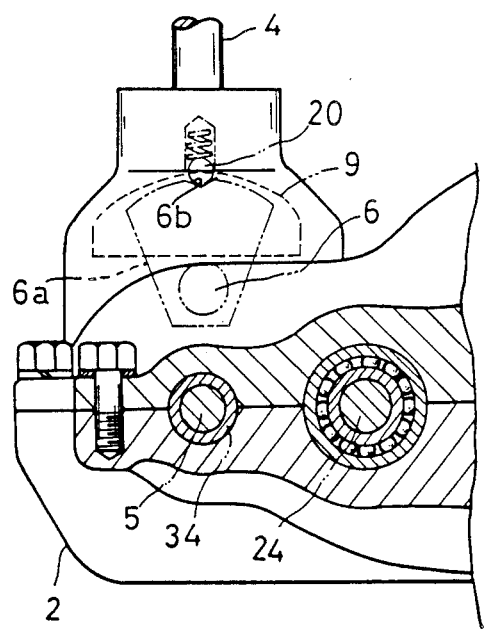
FIG. 4 is a sectional view taken on the line V—V in FIG. 3.
Figure 7:
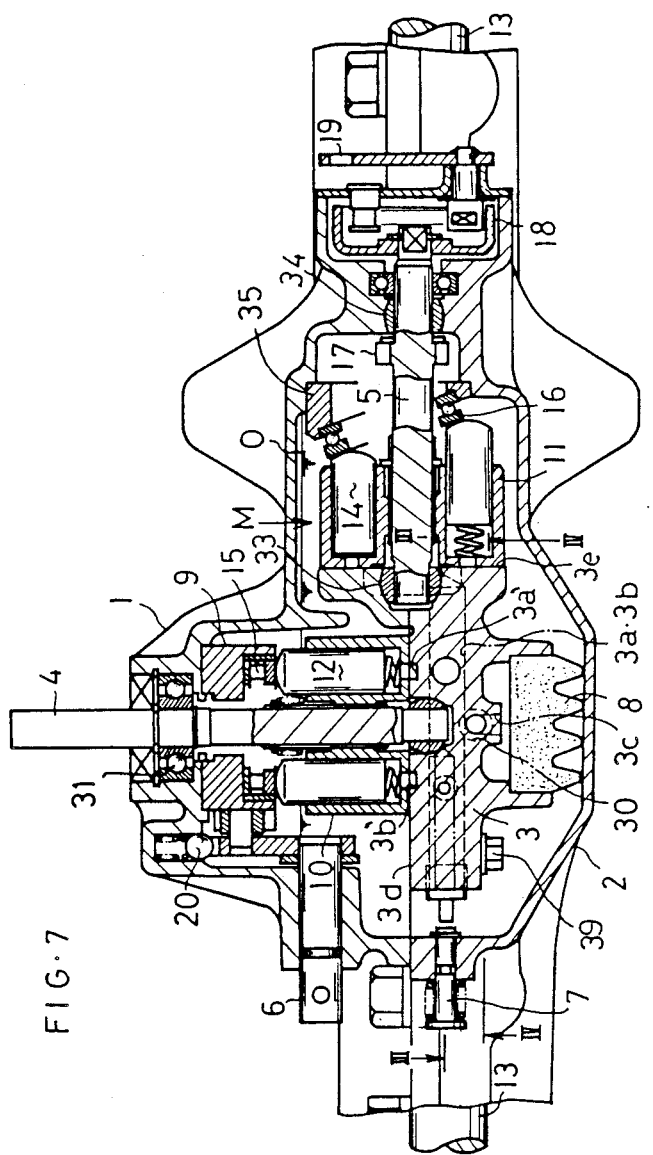
FIG. 7 is a sectional front view of a modified embodiment of the axle driving apparatus of the invention, in which check valves 26 and 27 are different in arrangement from the FIG. 2 embodiment.
Figure 8:
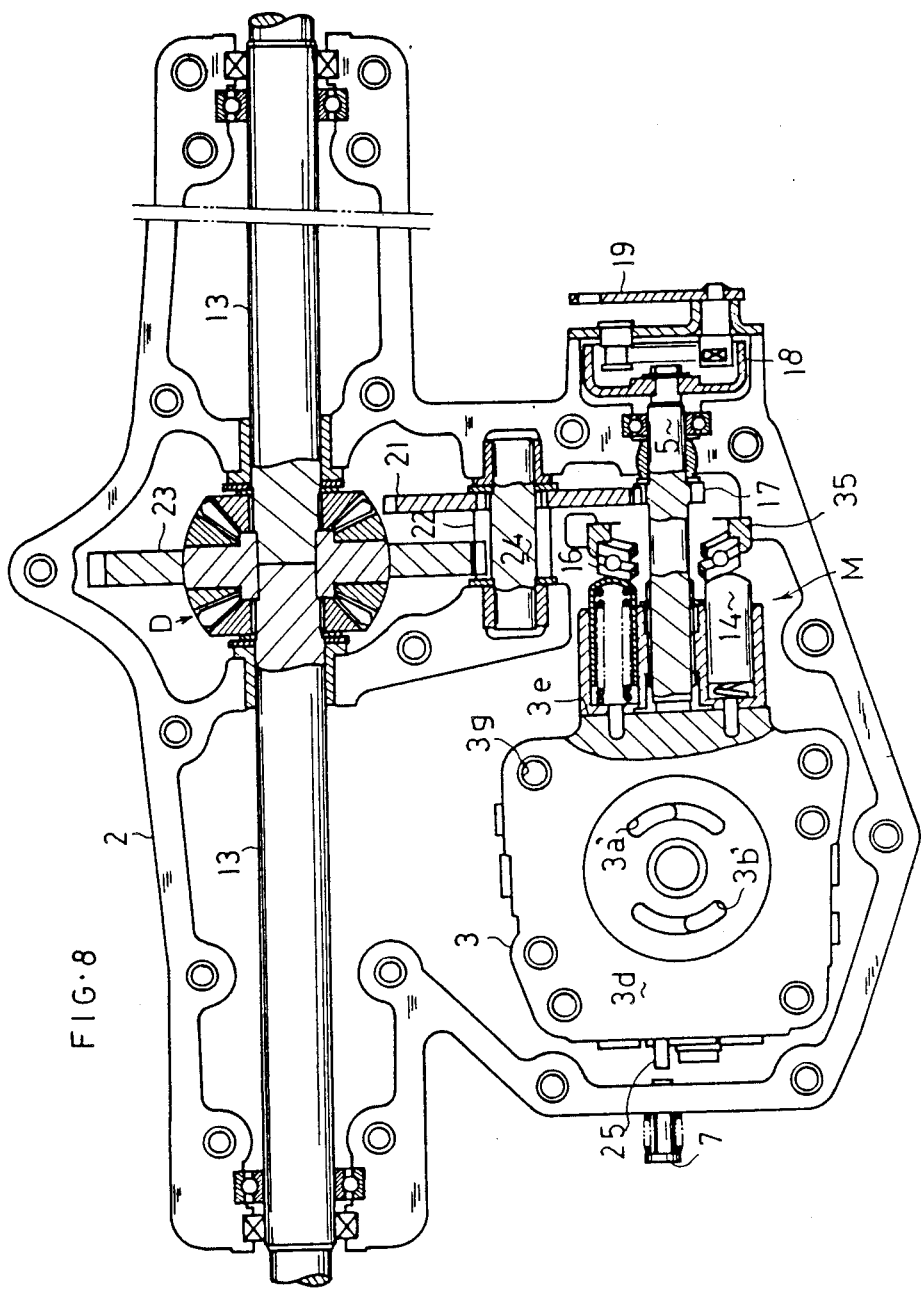
FIG. 8 is a plan view of the FIG. 7 embodiment.
Figure 9:
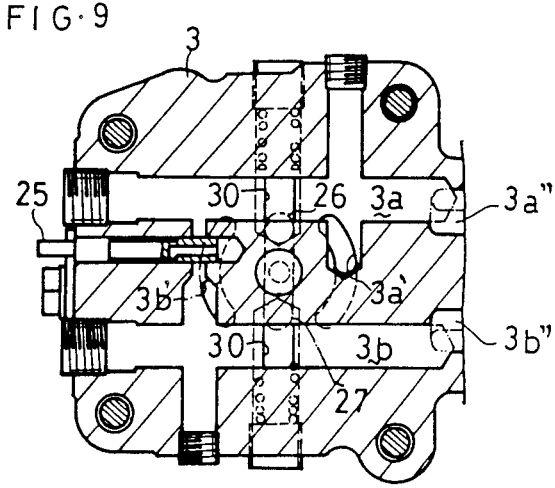
FIG. 9 is a sectional view taken on the line III—III in FIG. 7, showing a center section.
Figure 10:
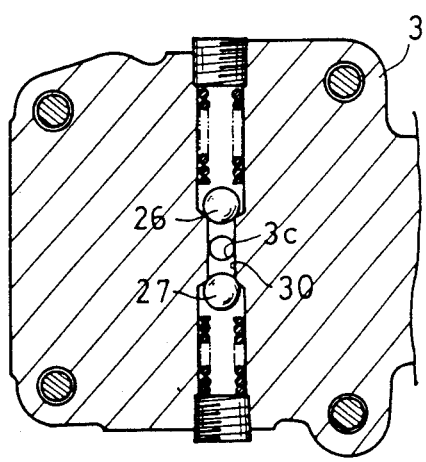
FIG. 10 is a sectional view taken on the line IV—IV in FIG. 7.
Figure 11:
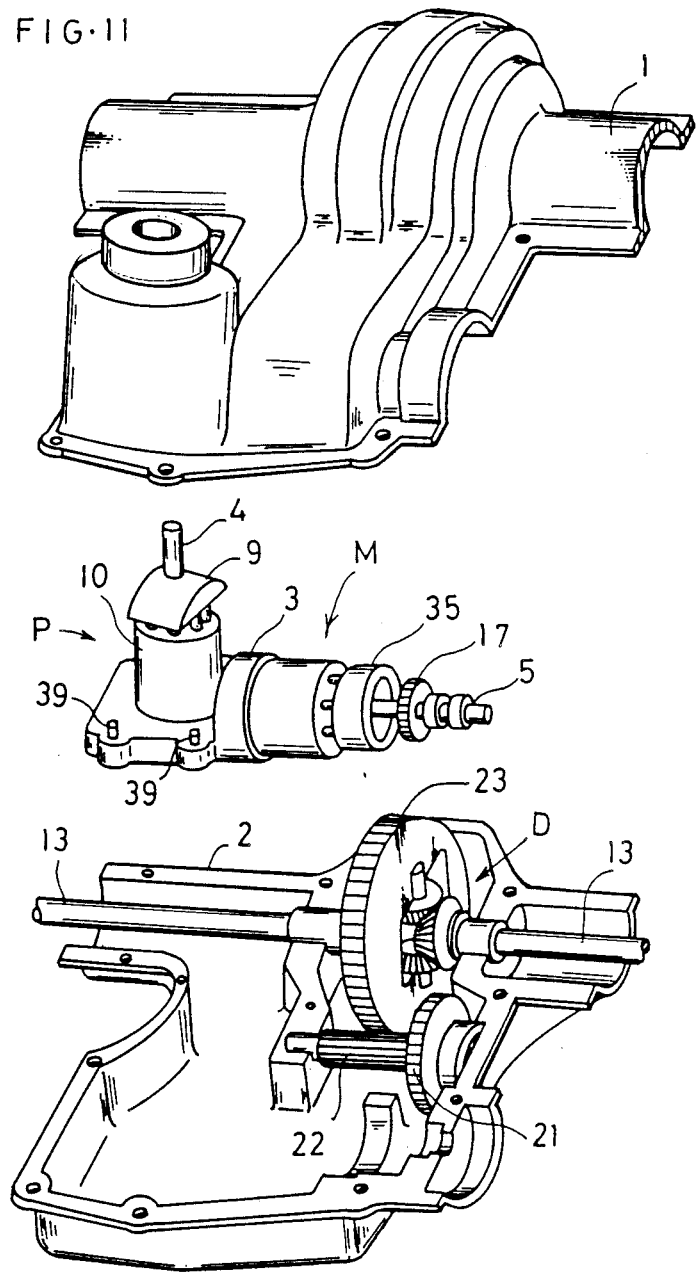
FIG. 11 is a perspective exploded view of the axle driving apparatus of the invention.

As shown in FIG. 4, the swash plate 9 is changeable of its angle through a positioning plate 6a in association with rotation of a speed change lever shaft 6, a detent unit 20 for holding the neutral position of the speed change lever shaft 6 being constituted in the upper half casing 1.

The detent unit 20 is fitted into a recess 6b at the positioning plate 6a, thereby enabling the neutral position to be ensured.

Figure 2:
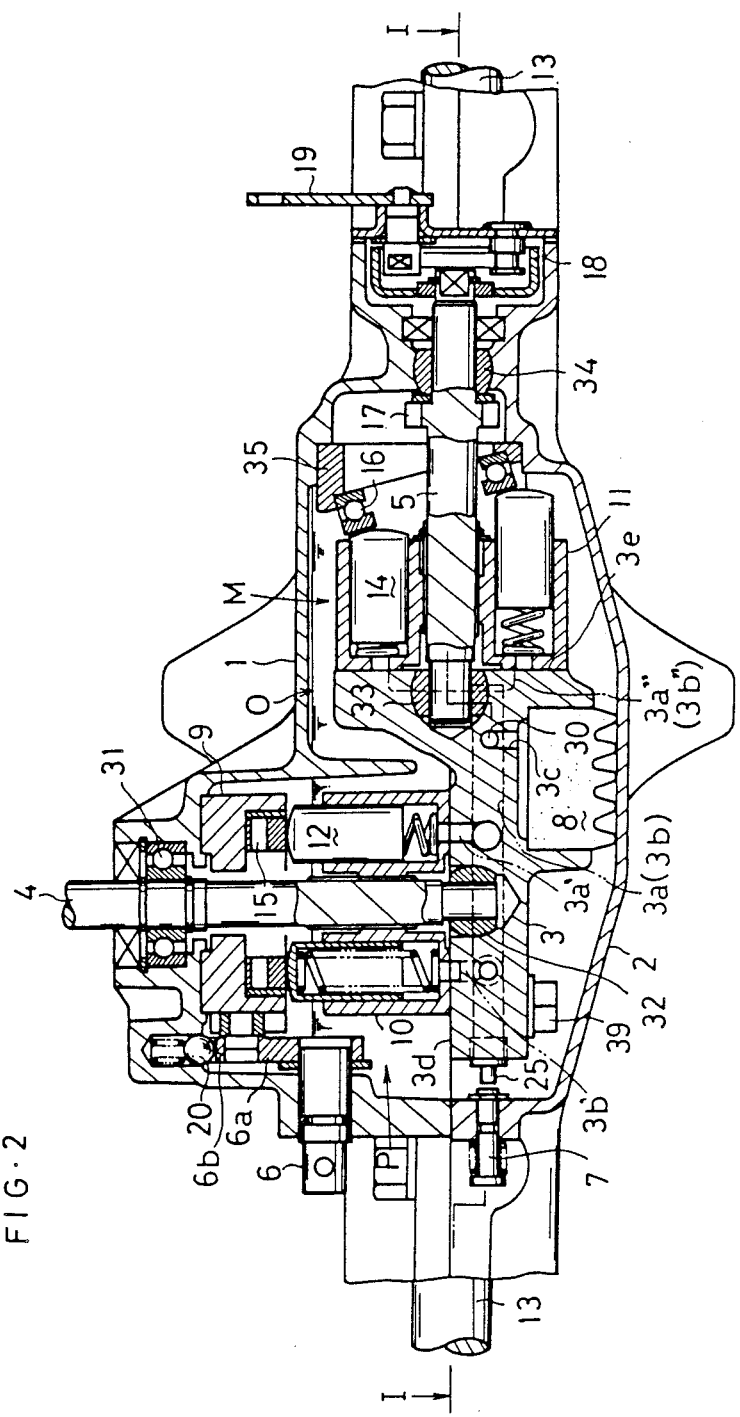
FIG. 2 is a sectional front view of an embodiment of the axle driving apparatus of the invention.

As shown in FIGS. 2 and 3, a short-circuit valve 25 of slidable selector valve for short-circuiting between the two oil passages 3a and 3b at the discharge side and the return side is disposed, so that when the valve 25 is changed over to haul the body of the tractor, generation of the state where the hydraulic motor M side is driven to send the pressure oil toward the hydraulic pump side can be avoided.

Reference numeral 7 designates a control for operating the short-circuit valve 25.

The short-circuit valve 25 and control 7 are slidably operated to push (to be disengageable) or pull (without engagement) to control the abutting condition. Such construction enables simple assembly of the apparatus.

Between the oil passages 3a and 3b at the center section 3 are interposed check valves 26 and 27 to form an oil feed route 30, and between the check valves 26 and 27 is bored an operating oil suction port 3c extending downwardly (FIG. 3).

In the lower end of operating oil suction port 3c is fitted an oil filter 8 formed of a spongy fine-porous material, the oil filter 8 contacting with the lower half casing 2 so as to be held thereto (FIG. 2).

Thus, the oil filter 8, operating oil suction port 3c and check valves 26 and 27 are provided to communicate with the oil passages 3a and 3b through the check valves 26 and 27, whereby in a case where the hydraulic motor M and hydraulic pump P operate and the operating oil leaks from the interior of the closed circuit so as to decrease, the oil passage 3a or 3b generates therein negative pressure so that lubricating oil in the casing is taken in as the operating oil in a closed fluid path.

In addition, reference character 0 designates an oil level of lubricating oil filled into the transmission casing (FIG. 2).

The pump mounting surface 3d at the center section 3 is somewhat larger in its flat surface to also serve as the surface through which the center section 3 is mounted to the lower surface of the upper half casing 1.

A cylinder block 11 is rotatably mounted onto the motor mounting surface 3e at the center section 3, and pistons 14 are slidably fitted into a plurality of piston holes at the cylinder block 11 and always abut at the heads against a thrust bearing 16. In such construction, the pistons 14 push the thrust bearing 16 through the pressure oil from the oil passages 3a and 3b and slide down at the heads along the slanted surface of the thrust bearing so as to generate a torque, thereby rotating the cylinder block 11 and motor shaft 5.

The thrust bearing 16 is supported by an annular support 35 in relation of being slanted at a predetermined angle, the annular support 35 being fixedly sandwiched between the upper and lower half casings 1 and 2.

The motor shaft 5 is provided at one axial end journalled to the center section 3 with a spherical bush 33 and at the other end with a spherical bush 34, which are sandwiched between the upper and lower half casings 1 and 2.

A gear 17 is mounted on the motor shaft 5 and engages with a gear 21 on the counter shaft 24, the gears 17 and 21 constituting the first deceleration means (FIG. 3).

A small diameter gear 22 on the counter shaft 24 engages with a ring gear 23 at a differential gear unit D, which gives differential rotations to drive the axles 13.

The small diameter gear 22 and ring gear 23 constitute the second deceleration means.

A brake drum 18 is fixed to the foremost end of the motor shaft 5 and brake shoes are expanded radially outwardly by a brake lever 19 to contact with the brake drum 18, thereby exerting the braking action.

In FIG. 6, part of motor mounting surface 3e, against which the motor casing 11 for the hydraulic motor M abuts, is shown.

Referring to FIGS. 7, 8, 9 and 10, a modified embodiment of the axle driving apparatus of the invention will be described.

In the embodiment shown in FIGS. 2 and 3, the oil passages 3a and 3b and supply oil passage 30 are provided at the same plane, but in this case the motor mounting surface 3e must separate with respect to the pump mounting surface 3d, whereby the center section 3 cannot be compact to that extent and also the casing becomes larger.

Therefore, in the embodiment shown in FIGS. 7 through 10, in order to eliminate the above defects, the supply oil passage 30 is disposed to overlap with the oil passages 3a and 3b in a range of thickness of the lower portion of the center section 3 and below the oil passages 3a and 3b.

The supply oil passage 30 is bored to communicate at the upper half thereof with the lower halves in a manner of overlapping therewith. Hence, the oil passage connecting both the oil passages 30 and 3a, 3b is not required, thereby enabling the center section 3 to be made as smaller as possible in thickness.

At the center of the supply oil passage 30 is open an operating oil suction port 3c toward an oil filter 8 positioned below, and check valves 26 and 27 for opening or closing the communicating portion between the oil passages 3a and 3b are interposed in the supply oil passage 30 in relation of putting the operating oil suction port 3c between the check valves 26 and 27. Supply oil from the operating oil suction port 3c flows to the oil passages 3a and 3b through the portion at the supply oil passage 30 where the supply oil passes the check valves 26 and 27.

Thus, within the center section 3, the oil passages 3a and 3b, supply oil passage 30 and oil filter 8 overlap with each other, whereby the motor mounting surface 3e can approach the pump mounting surface 3d so as to enable the center section 3 to be compact.

Another modified embodiment in FIGS. 12 through 19 will be described.

Figure 12:
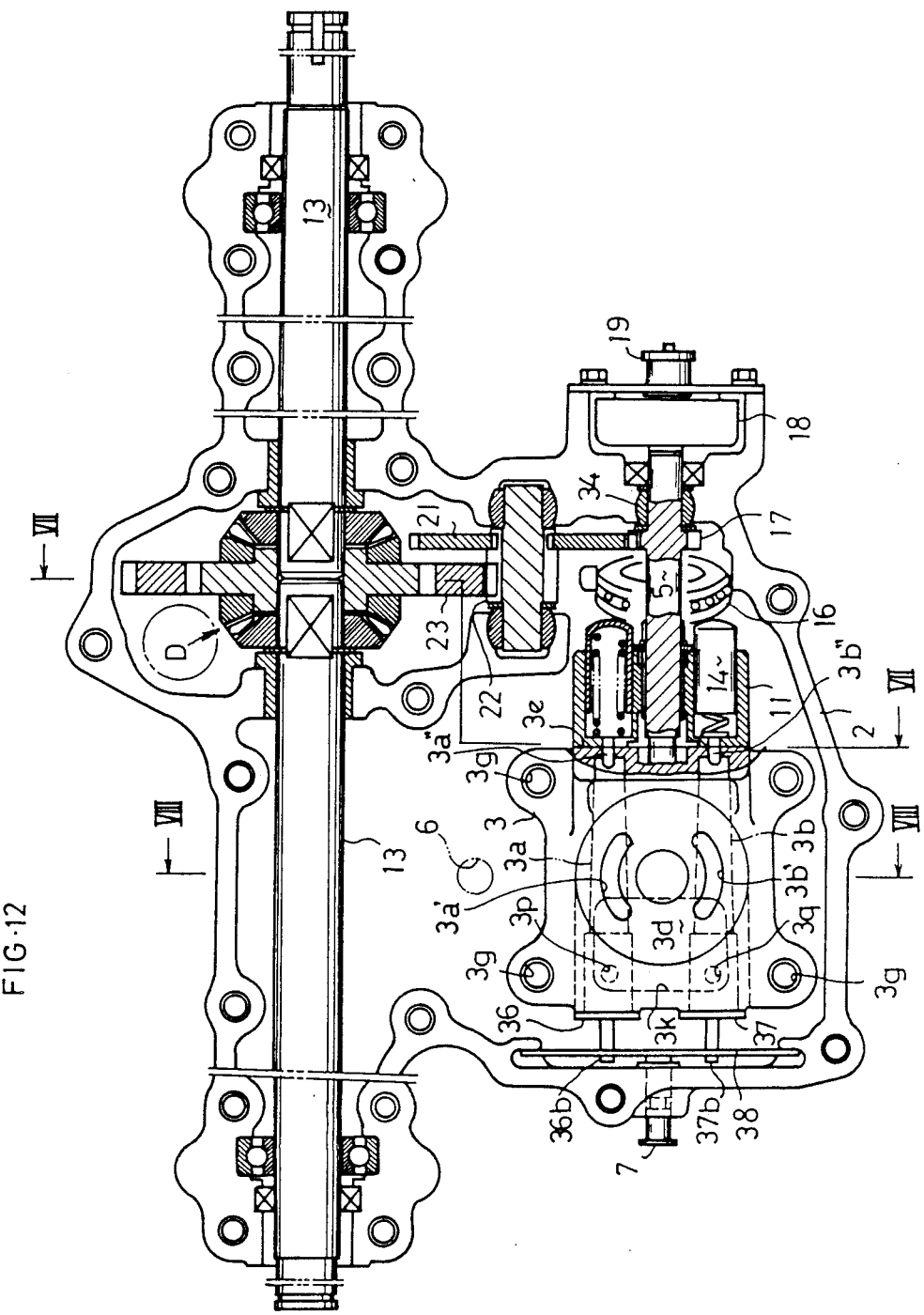
FIG. 12 is a sectional plan view of another modified embodiment of the axle driving apparatus of the invention, in which a swash plate control mechanism and a short-circuit valve are different in construction from the aforesaid embodiments.

A pair of crescent-shaped oil passages 3a″ and 3b″ are provided at the hydraulic motor mounting surface 3e of one side surface of the center section 3 and disposed laterally thereof. Two oil passages 3a and 3b communicating with the oil passages 3a″ and 3b″ are bored toward the other side surface of the same and in parallel to each other when viewed in plane. A pair of crescent-shaped oil passages 3a′ and 3b′ are provided at the hydraulic pump mounting surface 3d of the upper surface of the center section 3 and extend longitudinally of the same. The two oil passages 3a and 3b passing below the hydraulic pump mounting surface 3d communicate with the oil passages 3a′ and 3b′, thereby forming a closed circuit or fluid path between the hydraulic pump P and the hydraulic motor M. The pair of crescent-shaped oil passages 3a′ and 3b′ formed at the hydraulic pump mounting surface 3d are, in FIG. 3, disposed laterally when viewed in front so that the speed change lever shaft 6 projects laterally as shown in FIG. 2, but, in FIG. 12, are formed longitudinally when viewed in front, thereby enabling the speed change lever shaft 6 to be disposed in a space between the hydraulic pump P and the axle 13 as shown in FIG. 13.

Figure 13:
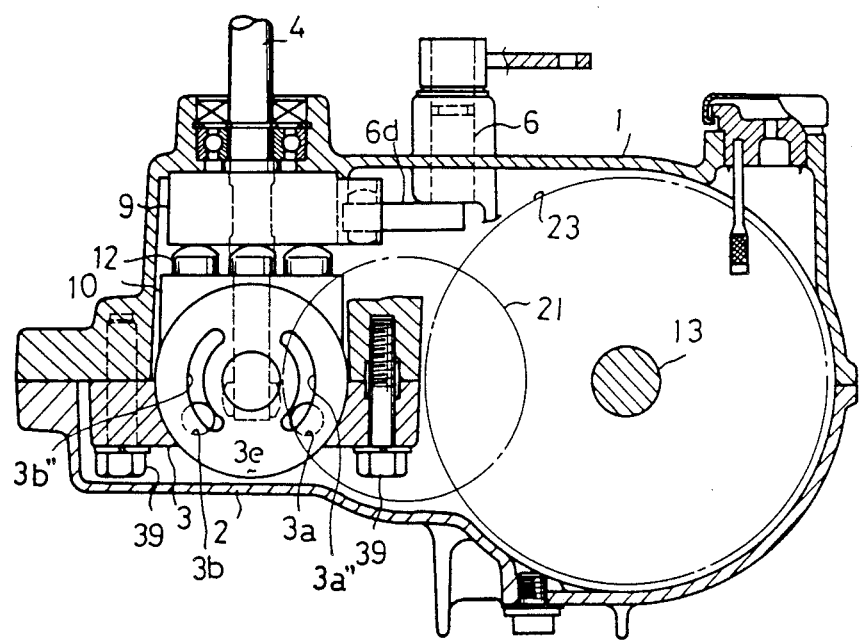
FIG. 13 is a sectional view taken on the line VII—VII in FIG. 12.
Figure 14:
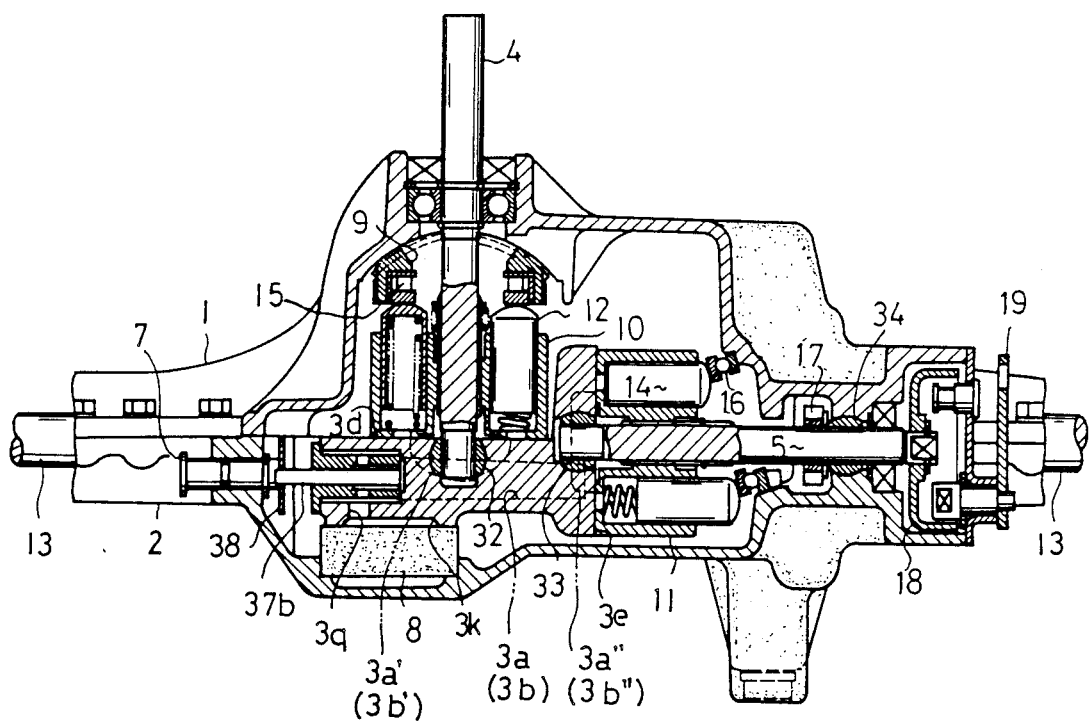
FIG. 14 is a sectional front view of the FIG. 12 embodiment.
Figure 15:
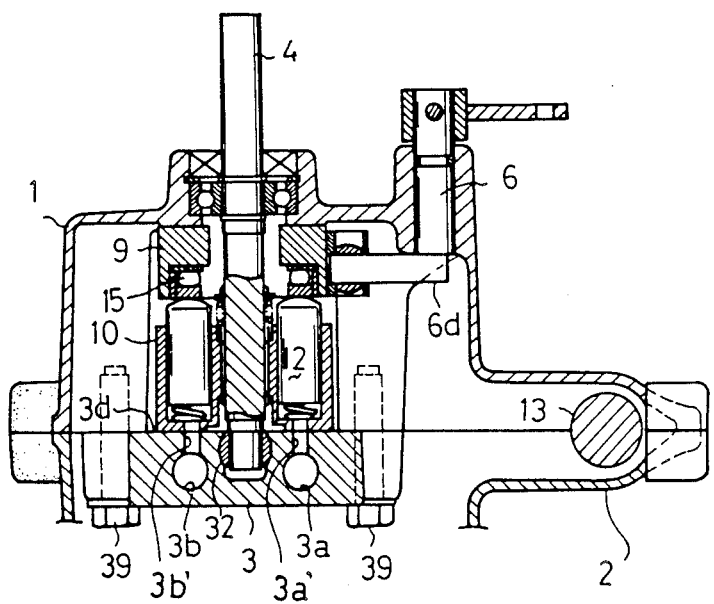
FIG. 15 is a sectional view taken on the line VIII—VIII in FIG. 12.
Figure 16:
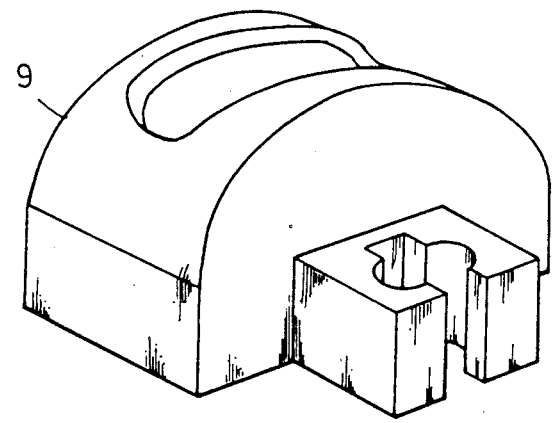
FIG. 16 is a perspective view of a variable swash plate.
Figure 17:
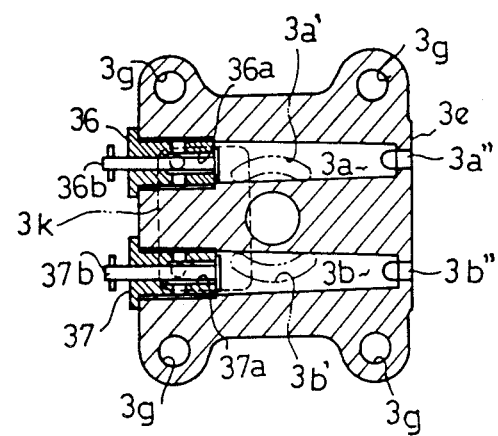
FIG. 17 is a sectional plan view of the center section.
Figure 18:
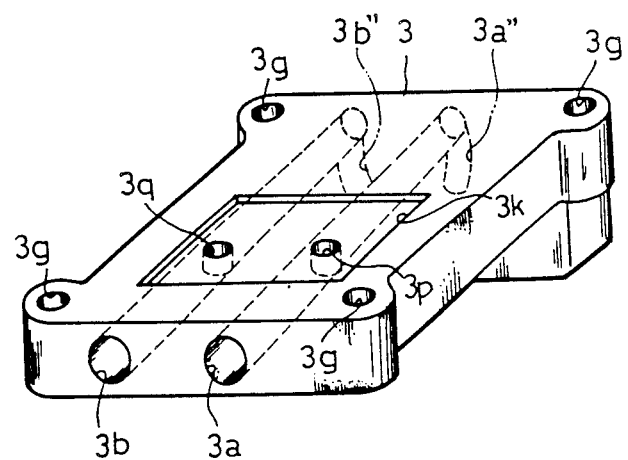
FIG. 18 is a perspective view thereof when viewed from the bottom.
Figure 19:
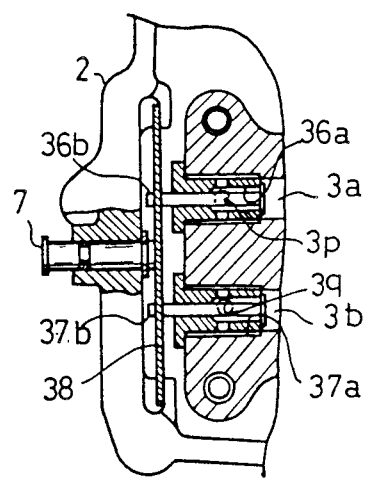
FIG. 19 is a sectional view of a slide lever.

The speed change lever shaft 6 for changing an angle of the swash plate 9 at the hydraulic pump P, as shown in FIG. 13, is formed in an L-like shape, and the utmost end of horizontal portion 6d of speed change lever shaft 6 is spherical and connects to the swash plate 9, thereby supporting the lever shape 6 in parallel to the pump shaft 4 and to be positioned between the pump shaft 4 and the axle 13.

Check valves 36 and 37 closing the openings at the oil passages 3a and 3b are inserted thereinto at the surface of center section 3 reverse to the motor mounting surface 3e, a recess 3k is provided at the bottom surface of the center section 3, operating oil suction ports 3p and 3q are bored vertically from the recess 3k toward the check valves 36 and 37 respectively, and an oil filter 8 of fine porous material, which is assembled across the operating oil suction ports 3p and 3q and in close contact with the bottom surface of center section 3 around the recess 3k, is disposed or fitted between the center section 3 and the lower half casing 2.

In the check valves 36 and 37 are provided oil passages 36a and 37a through which the operating oil suction ports 3p and 3q communicate with the oil passages 3a and 3b, valve levers 36b and 37b axially perforate the check valves 36 and 37, and the oil passages 36a and 37a are closed at the ends at the side of the oil passages 3a and 3b so as to operate as check valves and can open only toward the oil passages 3a and 3b from the operating oil suction ports 3p and 3q respectively.

The valve levers 36b and 37b project outwardly from the check valves 36 and 37 and are retained at the utmost ends to engaging grooves at a leaf spring 38 fixed to the lower half casing 2 respectively, the leaf spring 38 abutting at the central portion thereof against a control 7, the control 7 being slidably pivoted to the lower half casing 2.

Therefore, the valve levers 36b and 37b, when open by pressure oil, are restored by a spring force of leaf spring 38. Similarly, even when the control 7 pushes the leaf spring 38 to extract pressure in the hydro-static-transmission for traction or the like, a pushing force of control 7 is released to restore the valve levers 36b and 37b by the leaf spring 38.

The present invention constituted as the abovementioned is advantageous as follows:

Since the center section forming therein the aforesaid closed circuit is tight enclosed in the transmission casing, there is no fear that the operating oil leaked from the rotary surface of center section 3, a blind plug or a blowhole formed during the casing in the closed circuit subjected to high pressure oil, flows out from the transmission casing. Hence, lubricating oil therein is not reduced due to leakage and can be reliably used as the operating oil for the hydraulic pump P and hydraulic motor M.

The operating oil suction ports are formed at the open lower surface of center section 3, whereby air bubbles can be reduced in suction.

Since the oil filter is held between the center section and the lower half casing, it is simple to hold.

Since the control 7 at the transmission casing and the short-circuit valve at the center section 3 are separate from each other so as to associate with each other by abutment thereagainst, the center section 3 is simple to disassemble or assemble.

The pair of crescent-shaped oil passages at the hydraulic motor mounting surface and the pair of crescent-shaped oil passages communicate with each other as foregoing, whereby the closed circuit oil passage is simplified, thereby reducing manufacturing cost for the center section.

Since the aforesaid two check valves 26 and 27 are provided, instead of plugging the open ends of oil passages 3a and 3b forming the closed circuit, the operating oil supply mechanism can be simplified.

One oil filter of large width is provided across two operating oil suction ports and interposed between the lower surface of center section and the bottom of lower half casing, thereby simplifying the oil filter 8 in construction.

The two check valves can simultaneously be open to discharge the pressure oil in the closed circuit to the tank through the check valves and the hydraulic motor is made freely rotatable, thereby using the check valves also as the short-circuit valves.

One control is supported to the lower half casing in relation of being slidable across the inside and outside of the transmission casing and made controllable at the utmost end projecting into the lower half casing of the two check valves, whereby it can be held at the transmission casing and the center section is easy to dismantle or assemble.

The oil filter of fine porous material and larger in thickness in section can be simplified.

Although several embodiments have been described, they are merely exemplary of the invention and not to be constructed as limiting, the invention being defined by the appended claims.

What is claimed is:

1. An axle driving apparatus comprising:
    a transmission casing, said transmission casing including an upper casing and a lower casing joined together to form an enclosed transmission;
    a center section enclosed within said transmission casing, said center section supporting a hydraulic pump and a hydraulic motor;
    a closed fluid path for transfer of fluid between said hydraulic pump and said hydraulic motor provided within said center section, said closed fluid path being subjected to fluid pressure from said hydraulic pump to rotate said hydraulic motor;
    a suction port provided at a lower surface of said center section along said closed fluid path for providing fluid from said transmission casing to said hydraulic pump for rotating said hydraulic motor;
    first and second check valves disposed at an opening of said suction port, said check valves being simultaneously opened by a control means, wherein fluid within said closed fluid path is dischargeable from said center section through said check valves to an oil tank, and wherein said hydraulic motor is freely rotatable; and
    means for filtering fluid from said transmission casing disposed at an opening of said suction port, said filter means being fitted between said center section and said lower casing.

2. An axle driving apparatus as set forth in claim 1, wherein said filter means is formed of fine, porous material.

3. An axle driving apparatus as set forth in claim 1, wherein said control means is slidably supported by said lower casing from the inside of said casing to the outside thereof, said control means being controllable at a portion of said control which lies within said casing.

* * * * *

UNITED STATES PATENT AND TRADEMARK OFFICE
CERTIFICATE OF CORRECTION

PATENT NO. : 4,986,073

DATED : January 22, 1991

INVENTOR(S) : Hideaki Okada

It is certified that error appears in the above-identified patent and that said Letters Patent is hereby corrected as shown below:

Column 1, line 36, after "oil", insert --can--; and

Column 6, line 21, delete "casing" and substitute --casting-- therefor.

Signed and Sealed this

Twenty-sixth Day of May, 1992

*Attest:*

DOUGLAS B. COMER

*Attesting Officer*      *Acting Commissioner of Patents and Trademarks*